March 18, 1958 J. C. O'KANE ET AL 2,827,328
AIR DEFLECTOR FOR VEHICLE BODY
Filed April 2, 1956 4 Sheets-Sheet 1

Inventors
James C. O'Kane &
Arthur Ross
By Paul Fitzpatrick
Attorney

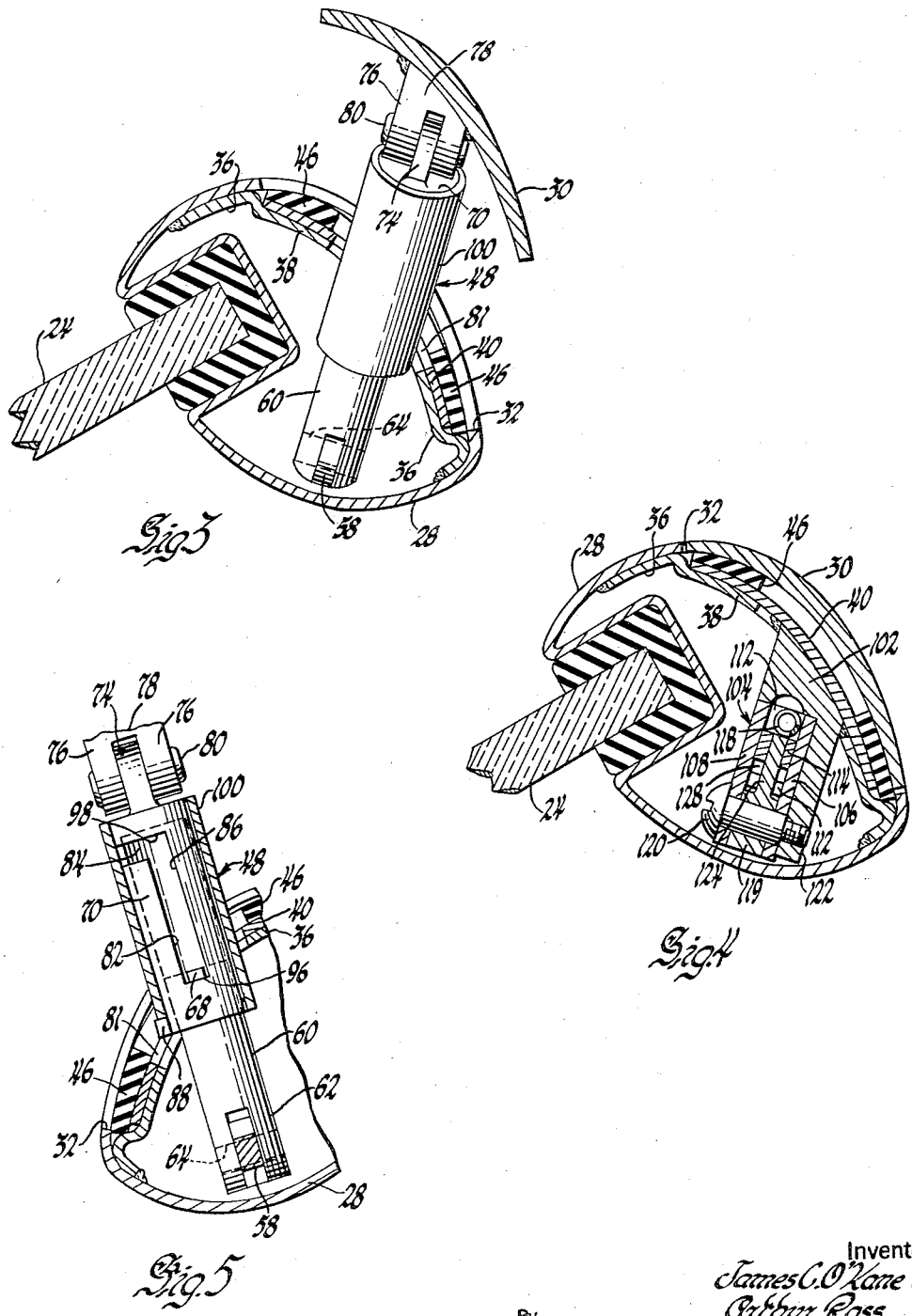

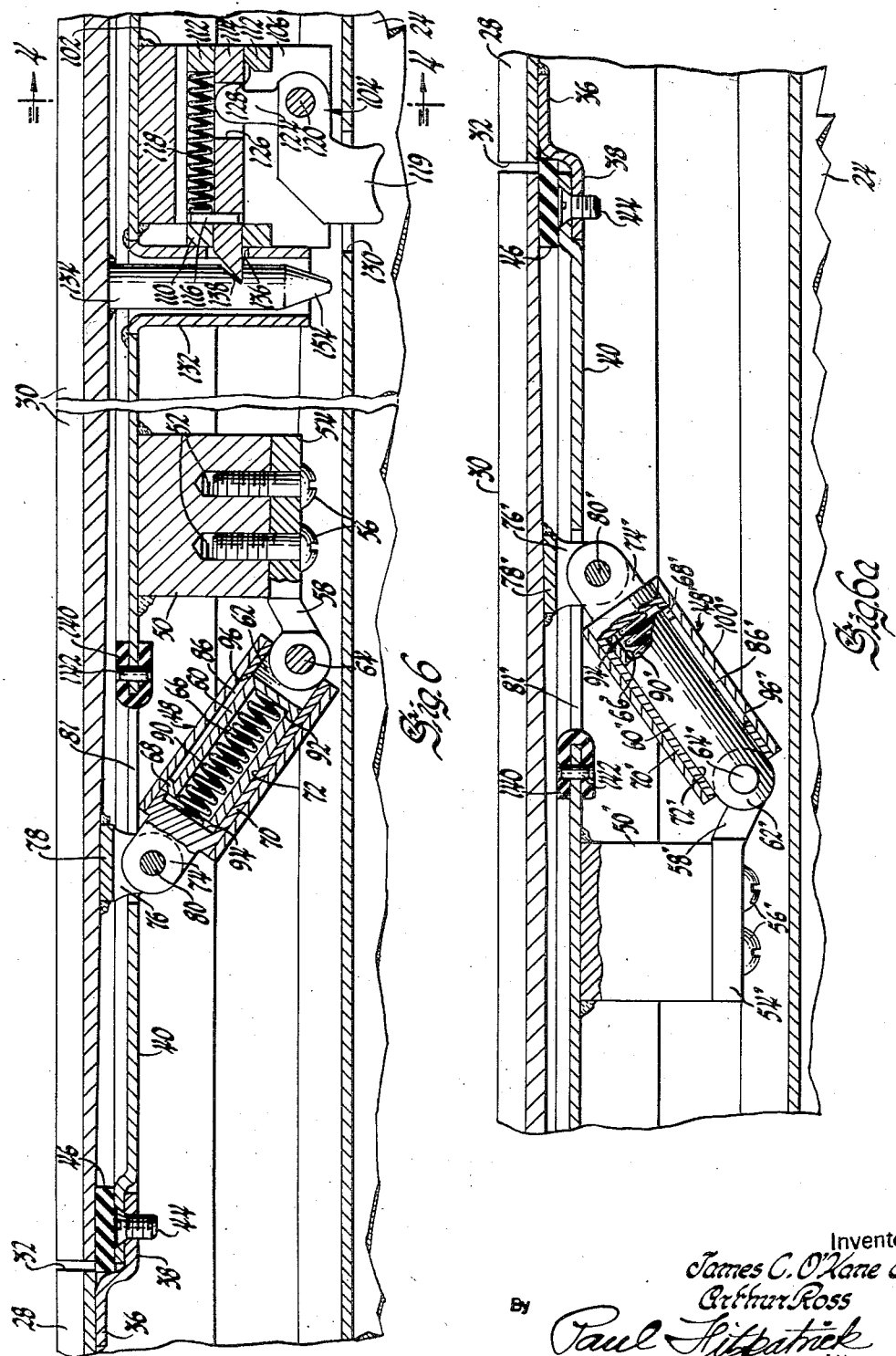

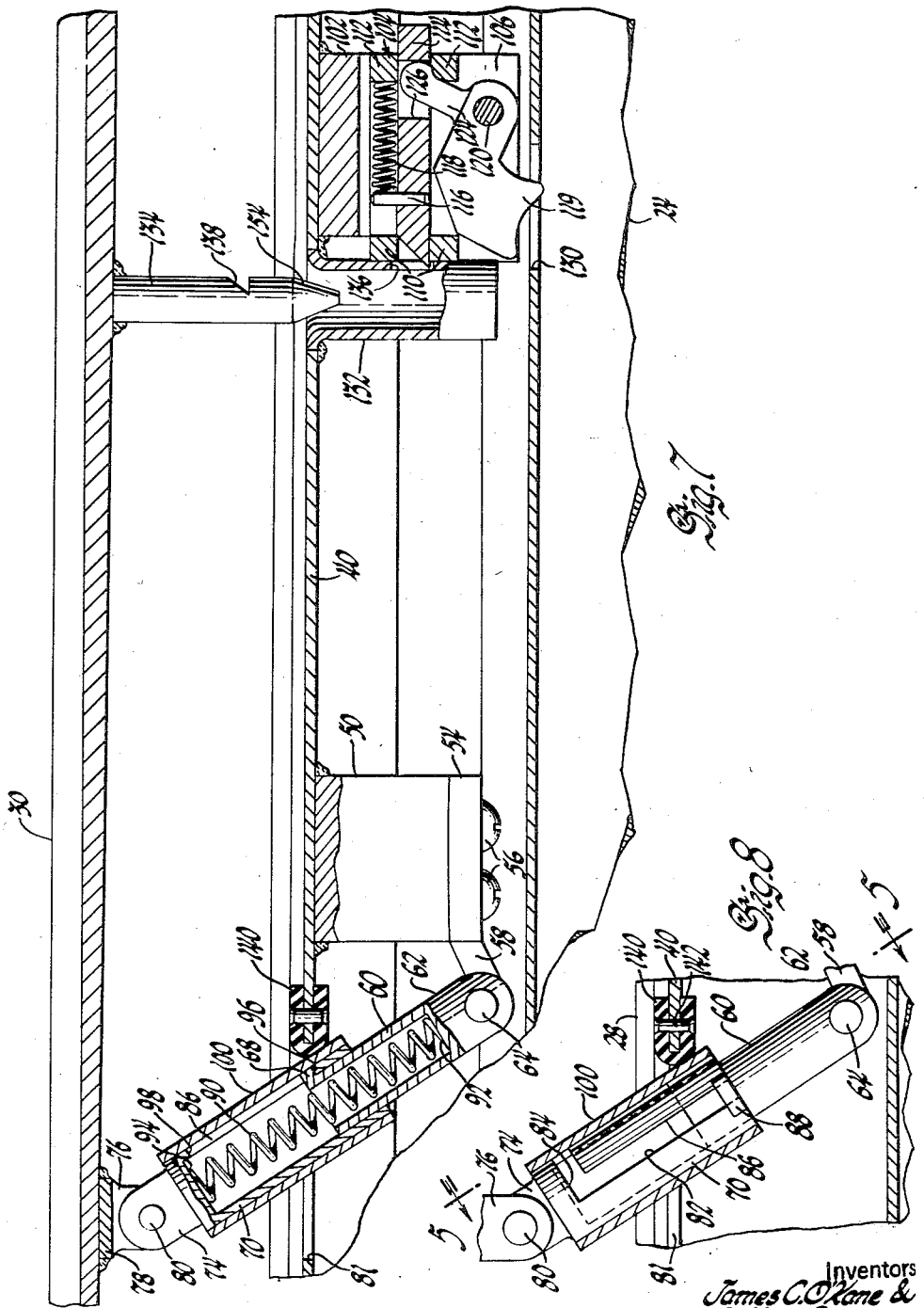

United States Patent Office 2,827,328
Patented Mar. 18, 1958

2,827,328

AIR DEFLECTOR FOR VEHICLE BODY

James C. O'Kane and Arthur Ross, Detroit, Mich., assignors to General Motors Corporation, Detroit, Mich., a corporation of Delaware Application April 2, 1956, Serial No. 575,568

9 Claims. (Cl. 296—94)

This invention relates to air deflectors for vehicle bodies and more particularly to an air deflector for convertible type vehicle bodies.

The ventilation of convertible type vehicle bodies presents many problems. In this type of body, the windshield is usually disposed angularly to the direction of the oncoming ambient air flow to direct the air away from the heads and faces of the driver and front seat passengers. This is desirable from a standpoint of comfort and safety. It is also desirable to circulate ambient air in the front passenger area of the body to increase the comfort of the driver and front seat passengers without having a direct air flow at their heads or faces.

This invention recognizes the problems of ventilation of convertible type vehicle bodies and solves these problems by providing one or more air deflectors of air foil cross section which are supported on the windshield header for bodily displaceable movement relative thereto between open and closed positions. In the closed position of the air deflector, it is located flush with the upper surface of the header to provide a neat appearance to the header and to the body. In the open position of the air deflector, it is located in spaced relationship to the upper surface of the header to define an air passage therewith which directs the flow of oncoming ambient air toward the torso and feet of the driver and the front seat passengers to ventilate the front passenger area of the body and increase the comfort of the occupants thereof.

The primary object of this invention is to provide an improved means for ventilating the front passenger area of convertible type vehicle bodies. Another object of this invention is to provide an improved means for ventilating the front passenger area of convertible type vehicle bodies by providing one or more air deflectors at the upper edge portion of the windshield which are movable to a position to direct oncoming ambient air within the front passenger area of the body.

These and other objects of this invention will be readily apparent from the following specification and drawings, in which:

Figure 3 is a view similar to Figure 2 showing the air deflector in open position;

Figure 4 is a sectional view on the plane indicated by line 4—4 of Figure 6 showing the air deflector in closed position and the latch mechanism which retains the air deflector in this position;

Figure 5 is a view taken on the plane indicated by line 5—5 of Figure 8 showing one of the supports for the air deflector in extended position, with parts broken away for clarity of illustration;

Figure 6 is a partial sectional view on the plane indicated by line 6—6 of Figure 2 showing one portion of the air deflector;

Figure 6a is a continuation of Figure 6 showing the other portion of the air deflector;

Figure 7 is a view similar to Figure 6 showing the air deflector in open position; and Figure 8 is a view partially in section of one of the supports for the air deflector in extended position.

Figure 1:
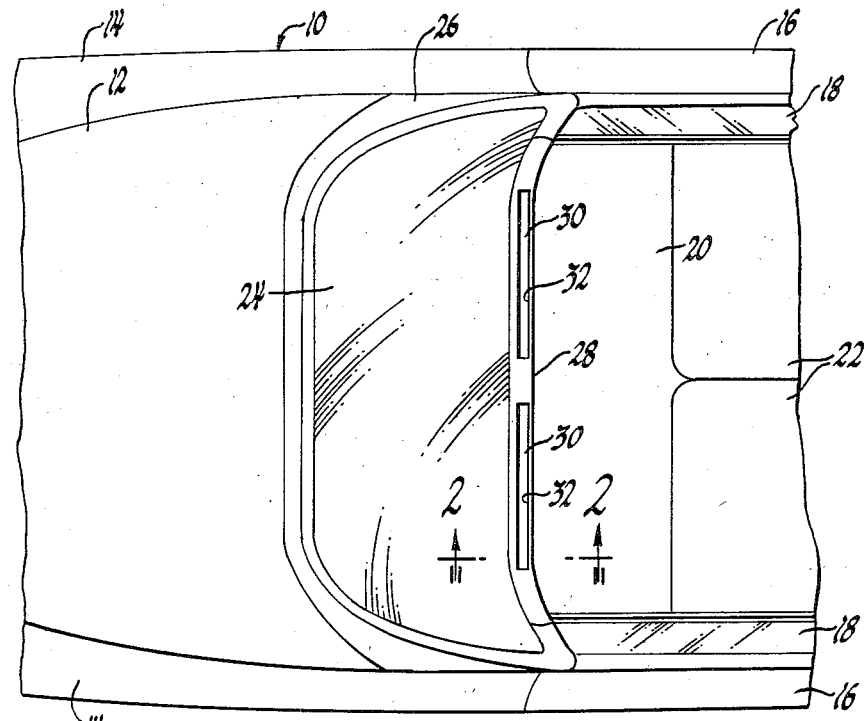
Figure 1 is a partial top plan view of a convertible type vehicle body embodying air deflectors according to this invention.

Referring now to Figure 1 of the drawings, a convertible type vehicle body 10 includes a hood 12, front fenders 14 on either side of the body, front doors 16 on either side of the body which support windows 18 for movement between a closed position, as shown, and an open position within the door well, a vehicle floor pan 20, and front seats 22 which are supported on the floor pan. A curved windshield 24 is angularly disposed relative to hood 12 and has its lower edge supported by the cowl panel 26. A hollow windshield header 28 spans the body around the upper edge of the windshield. A pair of air deflectors 30 are supported by the windshield header 28 for bodily movement between closed position, as shown, and open position spaced outwardly of the upper surface of the windshield header as will be described. Since the air deflectors 30 are of the same construction, only one such deflector will be described.

Referring now to Figures 1, 6, and 6a of the drawings, an elongated rectangularly shaped opening 32 slightly larger than the air deflector 30 is cut in the upper surface of the windshield header. An elongated rectangularly shaped mounting ring 36 is welded or otherwise secured to the inner surface of the windshield header adjacent the opening 32 therein and includes a continuous offset flange 38 which extends inwardly within opening 32. A cover plate 40 fits within opening 32 and rests on the continuous flange 38 of the mounting ring. The ends of the cover plate are secured to the opposite end portions of flange 38 by means of bolts 44. A continuous rectangularly shaped weather strip 46 is cemented or otherwise secured to the cover plate 40 around the edge thereof to provide a seal between the air deflector 30 and the plate in the closed position of the air deflector as shown in the drawings.

The air deflector 30 is supported adjacent either end thereof by extendable and retractable struts 48 and 48' which operate to continually bias the air deflector to open position. Intermediate the struts a latch mechanism is provided to retain the air deflector in closed position against the action of the struts. Referring now particularly to Figures 6, 6a, 7, and 8, one of the extendable and retractable struts will be described, and like parts of the other strut will be indicated by primed numerals. A lug 50 is welded to the inner surface of cover plate 40 and provided with a pair of spaced threaded bores 52. A hinge member 54 is bolted to lug 50 by bolts 56 and includes a laterally extending apertured ear 58. An inner strut member 60 includes a pair of spaced legs 62 which receive ear 58 and mount a pin 64 to pivotally secure the inner strut member to the ear. The inner strut member also includes a longitudinal bore 66 and a radially extending lug 68 extending outwardly from the strut adjacent the opening of bore 66.

An outer strut member 70 includes a bore 72 receiving the inner strut member and a longitudinally extending ear 74 which is received between the legs 76 of a bracket 78. Bracket 78 is welded to the inner surface of the air deflector 30 and the legs 76 of the bracket mount a pin 80 to pivotally secure ear 74 of the outer strut member 70 to the bracket. A rectangularly shaped opening 81 is cut in the cover plate 40 to allow connection of the outer strut member to the air deflector.

Referring now particularly to Figures 5 and 8, the outer strut member 70 includes an axially extending open slot 82 joined by a circumferentially extending slot 84 which extends partially around the strut member and is joined to a closed axially extending slot 86. Slot 82 opens to one end of the outer strut as shown in Figure 8 and the strut includes an offset portion 88 positioned over the opening of the slot. A coil compression spring 90 bears against the base 92 of the inner strut member and the base 94 of the outer strut member to continually bias the outer strut member axially outwardly of the inner strut member and bias the air deflector to open position.

When the inner and outer strut members are assembled to form strut 48, the compression spring 90 is first fitted within bore 66 of the inner strut member and then lug 68 of the inner strut member is inserted into slot 82 of the outer strut member within the offset portion 88. The inner and outer strut members are then moved toward each other to their retracted position so that lug 68 will pass inwardly within slot 82 to the junction of slot 82 with slot 84. The inner and outer strut members are then turned relative to each other, while being held in their retracted position, so that lug 68 will pass through slot 84 to the junction of this slot with slot 86. The strut members are then released and spring 90 will bias the strut members to their extending position as lug 68 moves outwardly within slot 86. Upon extension and retraction of the strut, lug 68 will move within slot 86 as the outer strut member moves axially outwardly and inwardly with respect to the inner strut member. Engagement of lug 68 with the end wall 96 of slot 86 limits the axial outward movement of the outer strut member and engagement of the lug with wall 98 of slot 86 limits the axial inward movement of the outer strut member. After the inner and outer strut members have been assembled as described, an outer sleeve member 100 is force fitted over the outer strut member so as to close slots 82, 84, and 86. The outer sleeve member has a cut out portion so as to fit around the offset portion 88 of the outer strut member. After strut 48 has been assembled, it is pivotally connected to the air deflector and to hinge member 54 as described.

As previously mentioned, a latch mechanism is provided to hold the air deflector in closed position against the action of the retractable and extendable struts which operate to continually bias the air deflector to open position. Referring now particularly to Figures 4, 6, and 7, the latch mechanism will be described. An L-shaped support 102 is welded to the inner surface of the cover plate 40. A latch mounting member 104 is secured to support 102 in a suitable manner and fits within the space defined by the legs of the support. Member 104 includes inner and outer walls 106 and 108, respectively, which are joined adjacent one edge thereof by integral spaced lugs 110 and adjacent the other edge thereof by integral spaced lugs 112. The openings defined by lugs 110 and 112 and the portions of the inner and outer walls between the lugs are substantially square and are in alignment with each other.

A latch member 114 is slidably supported by both the front and rear spaced lugs and moves within the openings defined by these lugs and the portions of the outer and inner walls between each pair of lugs. A pin 116 is secured to the latch member adjacent one end thereof and a coil compression spring 118 has one end bearing against pin 116 and the other end bearing against the upper lug 112 to continually bias the latch member to latched position as shown in Figure 6. An operating lever 119 is pivotally mounted on a shouldered bolt 120 which extends through aligned apertures in the inner and outer walls 106 and 108 of member 104 and is threaded in leg 122 of support 102 as shown particularly in Figure 4. Lever 119 includes an operating lug 124 which fits within a rectangularly shaped opening 126 in latch member 114.

In the latched position of latch member 114, the coil compression spring 118 urges the latch member 114 to the left of member 104 as viewed in Figure 4 until pin 116 abuts against the front upper lug 110. When it is desired to move the latch member to unlatched position, lever 119 is manually moved clockwise about bolt 120 as viewed in Figures 6 and 7 so that the operating lug 124 will shift latch member 114 to the right as shown in Figure 7 against the action of the coil compression spring 118. A portion of the lower lug 112 is cut away at 128 to provide clearance for lug 124 and act as a stop. Immediately upon release of the operating lever 119, the coil compression spring 118 will return the latch member to latched position. Figure 4 shows the latched position of the latch member 114 and Figure 7 shows the latch member in unlatched position, although the latch member will not remain in this position unless held. An opening 130 is cut in the lower wall of the windshield header 28 to provide clearance for lever 119 and to allow the lever to partially project into the passenger compartment of the vehicle so as to be located for easy operation by the driver or other front seat passenger.

Figure 2:
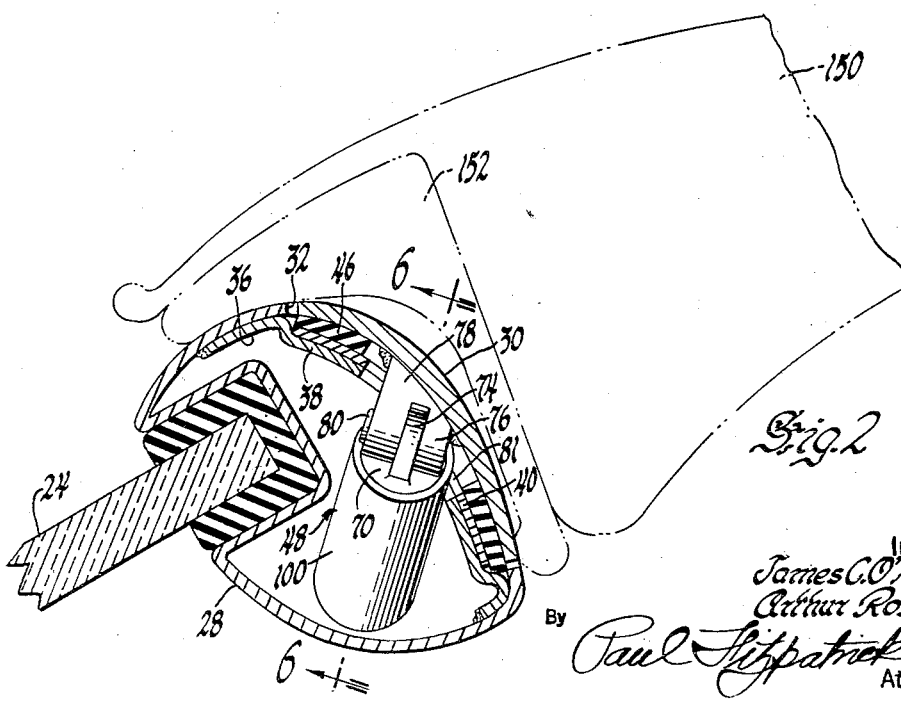
Figure 2 is an enlarged sectional view taken on the plane indicated by line 2—2 of Figure 1 showing the air deflector in closed position and one of the supports thereof in retracted position.

A circular opening is cut in the cover plate 40 intermediate openings 81 and 81' and a flared tube 132 fits within the opening with the flared end of the tube being welded to the cover plate as shown particularly in Figures 6 and 7. A striker pin 134 is welded to the lower surface of the air deflector 30 and projects within the flared tube 132 in the closed position of the air deflector as shown in Figure 6. An opening 136 is cut in tube 132 to allow the latch member 114 to project inwardly within the tube in latched position. A notch 138 in the striker pin is engaged by the triangular nose portion of the latch member when in latched position to retain the striker pin 134 within tube 132 and retain the air deflector 30 in closed position against the action of the retractable and extendable struts 48. When the air deflector is in closed position, it fits flush with the upper surface of the windshield header 28 as can be seen in Figures 2 and 4 to provide a neat appearance to the windshield header and to the body. If the convertible top (not shown) is in lowered position, the air deflector can be moved to its open position to direct oncoming air within the passenger compartment toward the torso and feet of the driver or front seat passenger.

In order to move the air deflector to open position, lever 118 is manually operated to move the latch member 114 to unlatched position, as shown in Figure 7, to release the striker pin 134. The coil compression springs 90 will then urge the outer strut members 70 axially outwardly of the inner strut members to move the air deflector to open position. As the outer strut members 70 move axially outwardly of the inner strut members 60, each strut 48 will pivot about both pivots 64 and 80. Since pivots 64 are located closer to each other than pivots 80, each of the strut assemblies must swing toward the center of the air deflector or toward each other in order for the air deflector to be moved outwardly to an open position substantially in alignment with the opening 32 in the upper surface of the windshield header. A rubber bumper 140 is riveted at 142 to the cover plate 40 at one end of openings 81 and 81' and is engaged by sleeve 100 and 100' on the outer strut members in their axially outward position as shown in Figures 7 and 8 to prevent damage to the strut member or noise. The rubber bumpers 140 also act as a limit stop with regard to extension of the struts and cooperate with the lower wall 96 or slot 86 in locating the air deflector in open position.

Referring now particularly to Figure 2 of the drawings, a convertible top header assembly 150 is indicated schematically by dot-dash lines when the convertible top is in raised position. It can be seen that in this position of the convertible top, the weather strip 152 which is carried by the top header will engage the upper surface of the windshield header 28 and will cover the air deflector 30. If the air deflector happens to be in open position and the top is raised, engagement of the weather strip 152 with the air deflector will return the air deflector to closed position. As the air deflector moves to closed position the conical nose portion 154 of the striker pin 134 will initially cam the latch member 114 to the right to unlatched position, as seen in Figure 7, as the striker pin moves inwardly within tube 132. The latch member 114 will then slide along the outer surface of the striker pin until it moves into notch 138 to engage the striker pin and retain the air deflector in closed position. The engagement of the latch member with the notch 138 in the striker pin is thus automatic upon movement of the air deflector to closed position.

If the air deflector happens to be in open position and it is desired to close the air deflector, the driver or front seat passenger merely pushes against the air deflector to move it to closed position wherein the latch member 114 will automatically engage the striker pin as previously described to retain the air deflector in this position. Thus, the air deflector is easily moved to open position by merely releasing latch member 114 and is also easily moved to closed position by merely moving the air deflector to this position wherein engagement of the latch member with the keeper pin is automatic.

As can be seen particularly in Figure 3, when the air deflector is in open position the lower air foil surface of the air deflector defines an air passage with the upper surface of the windshield header to direct the oncoming ambient air downwardly and inwardly within the front passenger compartment. Both the upper and lower surfaces of the air deflector are of air foil shape so as to present very little resistance to the oncoming ambient air and to also prevent turbulence. Thus, the shape of the passage defined by the lower surface of the air deflector and the upper surface of the windshield header will provide a smooth flow of oncoming ambient air to the passenger compartment.

Thus, this invention provides an air deflector for convertible type vehicle bodies which is movable between a closed position flush with the upper surface of the windshield header and an open position in spaced relationship to the upper surface of the header wherein the air deflector will provide a smooth flow of oncoming ambient air into the front passenger compartment of convertible type vehicle bodies. The air deflector is easily moved between open and closed position. There is no danger of damage to the air deflector if it happens to be in open position and when the convertible top is raised, since engagement of the top header with the air deflector will automatically move the air deflector to closed position. Although two such air deflectors are shown in the drawings, one on each side of the windshield header, it is obvious that only one such air deflector may be used or any number of air deflectors may be used as desired by the owner of the vehicle.

While a specific embodiment of this invention has been shown and described, various changes and modifications may be made within the scope and spirit of this invention.

We claim:

1. In combination with a vehicle body, a windshield mounted on said body, a windshield header at the edge portion of said windshield, air deflector means supported on said windshield header for bodily displaceable movement relative thereto between a first position and a second position wherein said air deflector means is located in spaced relationship with said windshield header to direct ambient air into said body, extendable and retractable means supported on said windshield header and operatively secured to said air deflector means for supporting said air deflector means for movement between said first and second positions, resilient means operatively biasing said air deflector means to said second position thereof upon extension of said extendable and retractable means, means limiting the extension movement of said extendable and retractable means to locate said air deflector means in said second position thereof, and means operative to retain said air deflector means in said first position thereof against the action of said resilient means.

2. In combination with a vehicle body, a windshield mounted on said body, a windshield header at the edge portion of said windshield, air deflector means supported on said windshield header for bodily displaceable movement relative thereto between a first position and a second position wherein said air deflector means is located in spaced relationship with said windshield header to direct ambient air into said body, linearly extendable and retractable means supported on said windshield header and operatively secured to said air deflector means for supporting said air deflector means for movement between said first and second positions, said extendable and retractable means being movable relative to each other upon linear extension thereof to move said air deflector means to said second position thereof, and means limiting the movement of said extendable and retractable means toward each other upon extension thereof to locate said air deflector means in said second position thereof.

3. In combination with a vehicle body, a windshield mounted on said body, a windshield header at the edge portion of said windshield, air deflector means supported on said windshield header for bodily displaceable movement relative thereto between a first position and a second position wherein said air deflector means is located in spaced relationship with said windshield header to direct ambient air into said body, extendable and retractable means swingably supported on said windshield header and operatively secured to said air deflector means for supporting said air deflector means for movement between said first and second positions, said extendable and retractable means being swingable relative to said header and to each other upon movement of said air deflector means to either of said positions, and means limiting the swinging movement of said extendable and retractable means to locate said air deflector means in either of said positions.

4. In combination with a vehicle body, a windshield mounted on said body, a windshield header at the edge portion of said windshield, air deflector means supported on said windshield header for bodily displaceable movement relative thereto between a first position and a second position wherein said air deflector means is located in spaced relationship with said windshield header to direct ambient air into said body, extendable and retractable means supported on said windshield header and operatively secured to said air deflector means for supporting said air deflector means for movement between said first and second positions, resilient means operatively biasing said air deflector means to said second position thereof, means limiting the extension and retraction movement of said extendable and retractable means to locate said air deflector means in either of said positions, and means operative to retain said air deflector means in said first position thereof against the action of said resilient means.

5. In combination with a vehicle body, a windshield mounted on said body, a windshield header at the edge portion of said windshield, air deflector means supported on said windshield header for bodily displaceable movement relative thereto between a first position and a second position wherein said air deflector means is located in spaced relationship with said windshield header to direct ambient air into said body, extendable and retractable strut means pivotally supported on said windshield header and pivotally secured to said air deflector means for supporting said air deflector means for movement between said first and second positions, resilient means operatively biasing said strut means to said extended position to move said air deflector means to said second position thereof, said strut means being swingable relative to said air deflector means and to each other upon movement of said air deflector means to either of said positions, means limiting the extension and retraction movement of said strut means to locate said air deflector means in either of said positions, and latch means operative to retain said air deflector means in said first position thereof against the action of said resilient means.

6. In combination with a convertible type vehicle body having a passenger compartment therein, a windshield mounted on said body forwardly of said compartment, a windshield header for said windshield, air deflector means supported on said windshield header for bodily displaceable movement relative thereto between a first position and a second position wherein said air deflector means is located in spaced relationship with said header to direct ambient air into said body, and a convertible top supported on said body and adapted to be disposed over said compartment and in engagement with said air deflector means and said windshield header, said air deflector means being movable from said second position thereof to said first position thereof upon engagement of said air deflector means by said convertible top when said convertible top is disposed over said passenger compartment and in engagement with said windshield header and said air deflector means.

7. In combination with a vehicle body, a windshield mounted on said body, a windshield header for said windshield, an air deflector supported on said header for bodily displaceable movement relative thereto between a first position and a second position wherein said air deflector is located in spaced relationship with said header to direct ambient air into said body, a pair of extendable and retractable struts supported on said header and operatively secured to said air deflector for supporting said air deflector for movement between said first and second positions, each of said struts including a pair of telescoping members linearly movable with respect to each other, means limiting the linear extension movement of said members with respect to each other to locate said air deflector in said second position thereof, resilient means biasing said air deflector to said second position thereof upon extension of said struts, and means operative to retain said air deflector in said first position thereof against the action of said resilient means.

8. In combination with a vehicle body, a windshield mounted on said body, a windshield header at the edge portion of said windshield, an air deflector supported on said header for bodily displaceable movement relative thereto between a first position and a second position wherein said air deflector is located in spaced relationship with said header to direct ambient air into said body, a pair of extendable and retractable struts supported on said header and operatively secured to said air deflector for supporting said air deflector for movement between said first and second positions, each of said struts including a pair of hollow telescoping members linearly movable with respect to each other, means limiting the linear extension movement of said members with respect to each other to locate said air deflector in said second position thereof, resilient means within said telescoping members for biasing said members to extended position to move said air deflector to said second position thereof, and means operative to retain said air deflector in said first position thereof against the action of said resilient means.

9. In combination with a vehicle body, a windshield mounted on said body, a windshield header at the edge portion of said windshield, an air deflector supported on said header for bodily displaceable movement relative thereto between a first position and a second position wherein said air deflector is located in spaced relationship with said header to direct ambient air into said body, a pair of extendable and retractable struts swingably supported on said header and swingably secured to said air deflector for supporting said air deflector for movement between said first and second positions, each of said struts including a pair of hollow telescoping members linearly movable with respect to each other, pin and slot means limiting the linear movement of said members with respect to each other to locate said air deflector in said second position thereof, compression spring means within said members for biasing said members to an extended position to move said air deflector to said second position thereof, and latch means operative to retain said air deflector in said first position thereof against the action of said spring means.

References Cited in the file of this patent

UNITED STATES PATENTS

| | | |
|---|---|---|
| 1,981,897 | Bishop | Nov. 27, 1934 |
| 2,028,542 | Gluhareff | Jan. 21, 1936 |
| 2,043,672 | Morrison | June 9, 1936 |
| 2,049,701 | Guyot | Aug. 4, 1936 |
| 2,328,659 | McKenna | Sept. 7, 1943 |
| 2,698,173 | Rydell | Dec. 28, 1954 |